United States Patent [19]
Yukuta et al.

[11] 3,941,732
[45] Mar. 2, 1976

[54] VULCANIZABLE RUBBER COMPOSITION HAVING IMPROVED PHYSICAL PROPERTIES

[75] Inventors: Toshio Yukuta, Kodaira; Takashi Ohashi, Iruma; Hiroshi Yoshsii, Kodaira, all of Japan

[73] Assignee: Bridgestone Tire Company Limited, Tokyo, Japan

[22] Filed: Dec. 12, 1974

[21] Appl. No.: 531,971

[30] Foreign Application Priority Data
Dec. 18, 1973  Japan............................ 48-140372

[52] U.S. Cl. .... 260/23.7 B; 260/23.7 M; 260/42.32; 260/42.36; 260/79.5 A; 260/79.5 P; 260/340.7; 260/784
[51] Int. Cl.² .. C08C 19/22; C08L 7/00; C08L 9/06
[58] Field of Search ......... 260/784, 23.7 M, 23.7 B, 260/79.5 A, 79.5 P, 340.7

[56] References Cited
UNITED STATES PATENTS

| | | | |
|---|---|---|---|
| 3,161,619 | 12/1964 | Rice et al.......................... | 260/340.7 |
| 3,287,320 | 11/1966 | Leech et al....................... | 260/340.7 |
| 3,317,444 | 5/1967 | Topcik ........................... | 260/23.7 B |
| 3,621,034 | 11/1971 | Fruhstorfer et al.............. | 260/340.7 |
| 3,651,176 | 3/1972 | Usamoto et al................. | 260/23.7 B |
| 3,679,707 | 7/1972 | Yoshimura et al. ............. | 260/340.7 |
| 3,895,036 | 7/1975 | Gelotte et al.................... | 260/340.7 |

*Primary Examiner*—Ronald W. Griffin
*Attorney, Agent, or Firm*—Brooks Haidt Haffner & Delahunty

[57] ABSTRACT

A stiffener, 3,9-(2-hydrazidoethyl)-2,4,8,10-tetraoxaspiro-[5,5]-undecane, is used for improving physical properties of rubber compositions.

8 Claims, 1 Drawing Figure

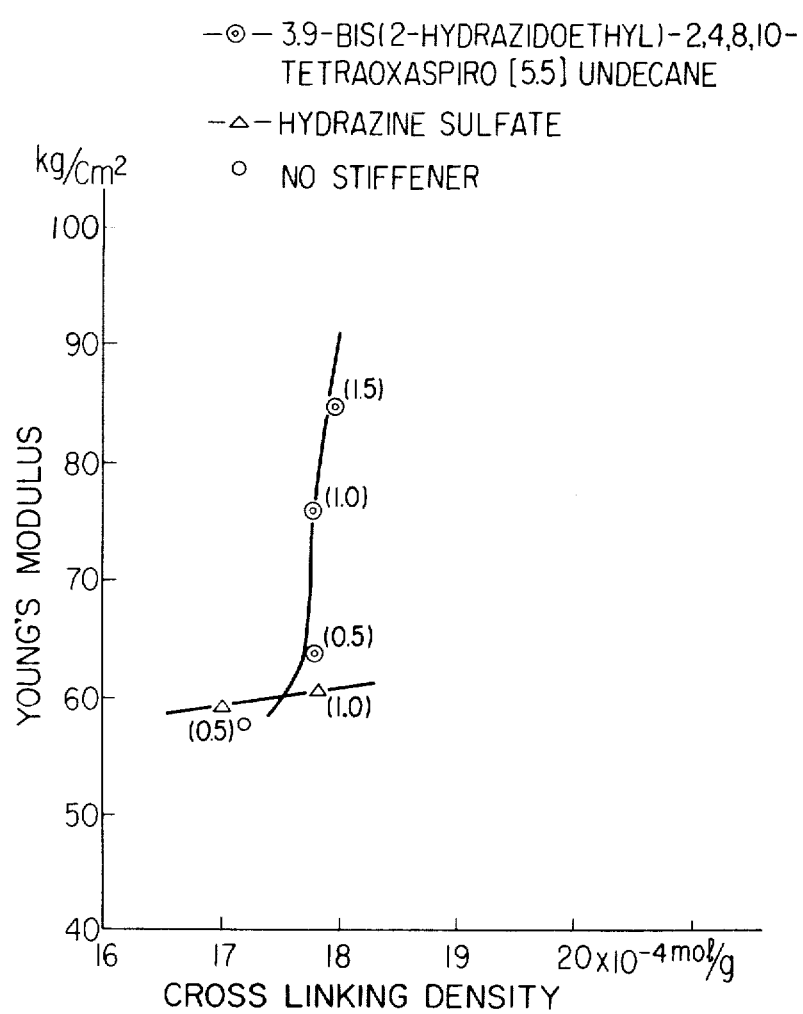
FIG. I

VULCANIZABLE RUBBER COMPOSITION HAVING IMPROVED PHYSICAL PROPERTIES

BACKGROUND OF THE INVENTION

1. Field of the Invention

The present invention relates to a vulcanizable rubber composition having improved physical properties.

2. Description of the Prior Art

Application fields of rubber composition have been recently broadened and as a result various specific properties have been demanded. For example, a tire, especially a tire used on a rough road, or a rubber article for industry such as a rubber belt for a mine should be prepared by a rubber composition which is not injured by rocks or stones, that is, it should have a high cut growth resistance. According to conventional methods, the cut resistance has been improved by incorporating an inorganic reinforcing agent such as carbon black, silica and the like or an organic reinforcing agent such as phenolic resin, rosin and the like, or incorporating a rubber having a different structure, for example, incorporating an unsaturated polar rubber into an unsaturated non-polar rubber. When the former method of incorporating an inorganic or organic reinforcing agent is used, the cut growth resistance of the vulcanized rubber is improved; however, the resilience of the rubber article decreases and the heat buildup shortens the life of the tire. When the latter method of incorporating an unsaturated polar rubber in an unsaturated non-polar rubber is used, a large quantity of the unsaturated polar rubber is required to improve cut growth resistance of the rubber composition and breaking strength of a vulcanized rubber, while the decrease of resilience can be prevented. As described above, it has been very difficult to obtain a rubber composition having both improved cut resistance and resilience.

On the other hand, cut growth resistance of the rubber composition can be improved by increasing the hardness. A stiffener is used to increase hardness of rubber. As a stiffener for rubber, organic polyamino compounds, quinones, hydrazine sulfate and the like are known. These stiffeners have been used to harden an unvulcanized rubber, prevent the deformation and improve the green strength. However, when these stiffeners are used to improve the hardness of a vulcanized rubber, a large quantity thereof is required. In this case, since vulcanization is greatly accelerated to cause scorching, increase crosslinking density, and cause other properties to deteriorate with increase of hardness. Accordingly the usual stiffeners are not satisfactory.

SUMMARY OF THE INVENTION

According to the present invention, there is provided a vulcanizable rubber composition having improved physical properties which comprises rubber and 3,9-bis(2-hydrazidoethyl)-2,4,8,10-tetraoxaspiro-[5,5]-undecane as a stiffener.

According to another aspect of the present invention, there is provided a stiffener for a rubber composition having improved physical properties comprising 3,9-bis(hydrazidoethyl)-2,4,8,10-tetraoxaspiro-[5,5]-undecane.

According to a further aspect of the present invention, there is provided a vulcanized rubber produced by vulcanizing a rubber composition in the presence of 3,9-bis(hydrazidoethyl)-2,4,8,10-tetraoxaspiro-[5,5]-undecane as a stiffener.

An object of the present invention is to provide an improved stiffener for a vulcanizable rubber composition.

Another object of the present invention is to provide a vulcanizable rubber composition incorporating the improved stiffener.

A further object of the present invention is to provide a vulcanizable rubber composition having improved cut growth resistance and resilience in the vulcanized state, as well as improved green strength in the unvulcanized state.

BRIEF DESCRIPTION OF THE DRAWING

FIG. 1 shows the relation between crosslinking density and Young's modulus in three kinds of rubber compositions. The values in the parentheses are amounts, in parts by weight of stiffeners per 100 parts by weight of rubber.

DESCRIPTION OF THE PREFERRED EMBODIMENTS

The present inventors have found that the green strength of an unvulcanized rubber and the hardness, cut growth resistance and resilience of a vulcanized rubber are improved together by using as a stiffener 3,9-bis(2-hydrazidoethyl)-2,4,8,10-tetraoxaspiro-[5,5]-undecane which is a dihydrazide compound having spiroacetal ring and the structural formula

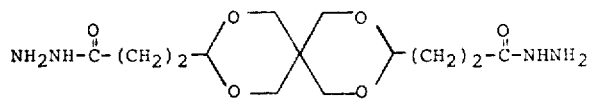

without generating scorching or increasing the crosslinking density as observed in the case using an amine compound or hydrazine sulfate.

In the present invention, the hardness, cut resistance and resilience of the vulcanized rubber as well as the green strength of the unvulcanized rubber are easily improved together by incorporating a small quantity of a hydrazide compound having a spiroacetal ring as a stiffener with natural rubber, synthetic rubber or a mixture thereof. This fact has provided one solution to the problem which was difficult to achieve in spite of various trials. It could not be expected that a rubber composition having high hardness, improved cut growth resistance and resilience could be prepared without deteriorating other properties by incorporating only a stiffener.

Rubber to be used in the present invention may be natural rubber, synthetic rubbers such as polyisoprene, styrene-butadiene copolymer, polybutadiene, ethylene-propylene copolymer, butyl rubber, nitrile rubber and the like and mixtures thereof.

The dihydrazide compound having a spiroacetal ring to be used in the present invention as a stiffener is 3,9-bis(2-hydrazidoethyl)-2,4,8,10-tetraoxaspiro-[5,5]-undecane. This compound is easily prepared by reacting 3,9-bis(2-carbomethoxyethyl)-2,4,8,10-tetraoxaspiro-[5,5]-undecane with hydrazine hydrate by the method described below.

One mole of 3,9-bis(2-carbomethoxyethyl)-2,4,8,10-tetraoxaspiro-[5,5]-undecane and 2 moles or more of hydrazine hydrate are heated and refluxed in methanol for about 5 hours, and then methanol and the excess of hydrazine hydrate are removed by a rotary evaporator under reduced pressure to prepare 3,9-bis(2-hydrazidoethyl)-2,4,8,10-tetraoxaspiro-[5,5]-undecane which is a white solid. This compound may be purified by recrystallization from methanol, and it is preferable to use this purified dihydrazide compound. The 3,9-bis(2-hydrazidoethyl)-2,4,8,10-tetraoxaspiro-[5,5]-undecane thus purified has a melting point of 155° – 156°C.

The amount of the stiffener used in the present invention is preferably 0.1 – 5.0 parts by weight per 100 parts by weight of rubber, and more preferably 0.5 – 2.0 parts by weight.

Further, common compounding ingredients, for example, a vulcanizing agent, an accelerating agent, an auxiliary agent, an antioxidant, a reinforcing agent such as carbon black, silica and the like, a softener, a coloring agent, a filler and the like may be added simultaneously in the practice of the present invention.

Mixing of compounding ingredients in the present invention may be carried out by a conventional mixing procedure using a mixing roll or Banbury mixer. The compounded rubber is changed to optional shapes by means of sheeting or extruding and is vulcanized by a usual vulcanizing procedure to obtain end products.

Since the rubber composition of the present invention has an improved hardness and green strength in the unvulcanized state, it is effective for preventing from deforming in the process of forming various products. Further the rubber composition of the present invention has an improved hardness, cut growth resistance and resilience in vulcanized state, and therefore it is used to produce a rubber tire, particularly, of a tread, a side wall and a carcass of tires for rough roads such as off the road tires, truck and bus tires, passenger tires for rough roads, bicycle tires for rough road and the like. Moreover, the rubber composition of the present invention is suitable for materials of belts for a mine, road building or repairing and the like.

Further, there is shown in FIG. 1 the relation between the crosslinking density and Young's modulus of the following three kinds of the rubber compositions. That is, the rubber composition prepared by incorporating 1.0 part by weight of 3,9-bis(2-hydrazidoethyl)-2,4,8,10-tetraoxaspiro-[5,5]-undecane to natural rubber (Examples 1 and 2), the rubber composition containing no stiffener (Comparative Examples 1) and the rubber composition prepared by incorporating 1.0 part by weight of hydrazine sulfate, to natural rubber (Comparative Examples 2 and 3). FIG. 1 clearly shows that the rubber composition of the present invention has improved properties.

The invention will be understood more readily by reference to the following examples, however, these examples are intended to illustrate the invention and are not to be construed to limit the scope of the invention. In the examples, parts are by weight unless otherwise specified.

EXAMPLES 1–2 AND COMPARATIVE EXAMPLES 1–3

The rubber compositions were obtained by compounding natural rubber with carbon black and 3,9-bis(2-hydrazidoethyl)-2,4,8,10-tetraoxaspiro-[5,5]-undecane as a stiffener and examined with respect to green strength in unvulcanized state and hardness, cut growth resistance and resilience in the vulcanized state.

The compounding recipe for each rubber composition is shown in Table 1. In addition, as other than the compounding ingredients shown in Table 1, 2.0 parts of sulfur, 4.0 parts of zinc oxide, 3.0 parts of stearic acid, 5.0 parts of pine tar, 1.5 parts of paraffin wax, 1.0 part of NOCRAC 810NA (trade mark of N-isopropyl-N'-phenyl-p-phenylene diamine, supplied by Ouchi Shinko Chemical Industrial Co. Ltd.) 0.4 part of NOCCELER MSA (trade mark of N-oxydiethylene-2-benzothiazol sulfonamide, supplied by Ouchi Shinko Chemical Industrial Co. Ltd.) as an accelerator and 1.0 part of phenyl-$\beta$-naphthylamine as an antioxidant, were commonly added to each rubber composition. The green strength in the unvulcanized state of each sample was estimated by measuring tensile strength of JIS No. 1 dumbbell sample which was prepared by punching out from each unvulcanized rubber sheet by means of an Instron tester according to JIS-K-6301. The hardness was estimated by means of JIS tester of hardness according to JIS-K-6301.

The resilience was estimated by means of a Dunlop trimeter according to British Standard 903. A higher value of the specimen shows a greater resiliency of the rubber composition.

The cut growth resistance was estimated by measuring cut area suffered by impact strength by means of an impact cut tester having impact weight of 100 Kg and arm length of 100 cm. The smaller value shows the better cut growth resistance of the rubber composition.

The values of physical properties shown in Table 1 are represented as an index number based on the values of the physical properties of the composition not containing any stiffener which is represented as 100.

Table 1

| Compounding Ingredients (parts by wt.) | Comparative Example 1 | Example 1 | Example 2 | Comparative Example 2 | Comparative Example 3 |
|---|---|---|---|---|---|
| Natural Rubber | 100 | 100 | 100 | 100 | 100 |
| Carbon black | 45 | 45 | 45 | 45 | 45 |
| Stiffener A * |  | 0.5 | 1.0 |  |  |
| Stiffener B ** |  |  |  | 0.5 | 1.0 |
| Physical Properties |  |  |  |  |  |
| Green strength (index) | 100 | 116 | 128 | 106 | 113 |
| Hardness (index) | 100 | 103 | 105 | 100 | 102 |
| Cut growth resistance (index) | 100 | 92 | 79 | 91 | 86 |
| Resilience (index) | 100 | 105 | 107 | 104 | 105 |

NOTE:
* 3,9-bis(2-hydrazidoethyl)-2,4,8,10-tetraoxaspiro-[5,5]-undecane
** hydrazine sulfate Table 1 shows that the rubber compositions (Examples 1 and 2) of the present invention are superior to the rubber composition (Comparative Example 1) containing no stiffener and the rubber compositions (Comparative Examples 2 and 3) containing hydrazine sulfate which is usually used as a stiffener in the green strength in unvulcanized state and in hardness, cut growth resistance and resilience in vulcanized state.

The relation between Young's Modulus and crosslinking density was examined with respect to each rubber vulcanizate shown in Table 1.

The results obtained are shown in FIG. 1. FIG. 1 shows that the rubber vulcanizate obtained by the present invention had markedly higher Young's Modulus in the same level of crosslinking density than that of the rubber vulcanizate to which a usual stiffener was added.

EXAMPLES 3–4 AND COMPARATIVE EXAMPLES 4–6

The same experiments as those in Examples 1 and 2 were repeated except that Natsyn IR 2200 (trade mark for cis 1,4-polyisoprene, supplied by Japan Synthetic Rubber Co.) was used in place of natural rubber.

The results are shown in Table 2.

EXAMPLE 5 AND COMPARATIVE EXAMPLES 7 AND 8

The rubber compositions were prepared by compounding SBR 1500 (trade mark of styrene-butadiene copolymer containing 23.5% by weight of styrene, supplied by Japan Synthetic Rubber CO.), carbon black and 3,9-bis(2-hydrazidoethyl)-2,4,8,10-tetraoxaspiro-[5,5]-undecane as a stiffener and evaluated with respect to green strength in the unvulcanized state and hardness, cut growth resistance and resilience in the vulcanized state in the same manner as in Examples 1 and 2.

The compounding recipes for each rubber composition are shown in Table 3. In addition, the others than the compounding ingredients shown in Table 3, which were 1.6 part of sulfur, 3.0 parts of zinc oxide, 9.0 parts of an aromatic oil, 3.0 parts of stearic acid, 1.5 part of paraffin wax, 1.0 part of NOCRAC 810 NA (trade mark of N-isopropyl-N'-phenyl-p-phenylenediamine, supplied by Ouchi Shinko Chemical Industrial Co. Ltd.), 0.3 parts by weight of NOCCELER D (trade Table 2

| Compounding Ingredients (parts by wt.) | Comparative Example & Example No. | | | | |
|---|---|---|---|---|---|
| | Comparative Example 4 | Example 3 | Example 4 | Comparative Example 5 | Comparative Example 6 |
| Polyisoprene | 100 | 100 | 100 | 100 | 100 |
| Carbon black | 45 | 45 | 45 | 45 | 45 |
| Stiffener A * | | 0.5 | 1.0 | | |
| Stiffener B ** | | | | 0.5 | 1.0 |
| Physical Properties | | | | | |
| Green strength (index) | 100 | 115 | 120 | 109 | 112 |
| Hardness (index) | 100 | 103 | 105 | 102 | 103 |
| Cut growth resistance (index) | 100 | 82 | 66 | 88 | 80 |
| Resilience (index) | 100 | 101 | 104 | 103 | 105 |

NOTE:
* 3,9-bis(2-hydrazidoethyl)-2,4,8,10-tetraoxaspiro-[5,5]-undecane
** Hydrazine sulfate Table 2 shows that the rubber compositions (Examples 3 and 4) of the present invention are superior to the rubber composition (Comparative Example 4) containing no stiffener and the rubber compositions (Comparative Examples 5–6) containing hydrazine sulfate which is usually used as a stiffener.

Furthermore, it is concluded that the effect of the stiffener of the present invention on synthetic rubber is equivalent to, or larger than that on natural rubber, whereas the usual stiffener is effective only on natural rubber.

mark of diphenyl guanizine supplied by Ouchi Shinko Chemical Industrial Co. Ltd.) as an accelerating agent and 1.0 part of phenyl-β-naphtylamine as an antioxidant, were commonly added to each composition.

The results are shown in Table 3.

Table 3

| Compounding Ingredients (parts by wt.) | Comparative Examples & Example No. | | |
|---|---|---|---|
| | Comparative Example 7 | Example 5 | Comparative Example 8 |
| Styrene-butadiene copolymer | 100 | 100 | 100 |
| Carbon black | 47 | 47 | 47 |
| Stiffener A * | | 0.75 | |
| Stiffener B ** | | | 0.75 |
| Physical Properties | | | |
| Green strength (index) | 100 | 106 | 97 |
| Hardness (index) | 100 | 108 | 100 |
| Cut growth resistance (index) | 100 | 67 | 96 |
| Resilience (index) | 100 | 104 | 101 |

Note:
* 3,9-bis(2-hydrazidoethyl)-2,4,8,10-tetraoxaspiro[5,5]-undecane
** Hydrazine sulfate Table 3 shows that the rubber composition (Example 5) of the present invention was remarkably improved in green strength in the unvulcanized state and in hardness, cut growth resistance and resilience in the vulcanized state as compared to both the rubber composition (Comparative Example 7) containing no stiffener and the rubber composition (Comparative Example 8) containing hydrazine sulfate which is a usual stiffener.

In the case described above, hydrazine sulfate was hardly effective, whereas the stiffener of the present invention was markedly effective.

We claim:
1. A vulcanizable rubber composition which comprises rubber and 3,9-bis(2-hydrazidoethyl)-2,4,8,10-tetraoxaspiro-[5,5]-undecane as a stiffener.

2. A vulcanizable rubber composition according to claim 1 which comprises 100 parts by weight of rubber and 0.1 – 5.0 parts by weight of 3,9-bis (2-hydrazidoethyl)-2,4,8,10-tetraoxaspiro-[5,5]-undecane.

3. A vulcanizable rubber composition according to claim 1 which comprises 100 parts by weight of rubber and 0.5 – 2.0 parts by weight of 3,9-(2-hydrazidoethyl)-2,4,8,10-tetraoxaspiro-[5,5]-undecane.

4. A vulcanizable rubber composition according to claim 1, in which said rubber is at least one selected from the group consisting of natural rubber, polyisoprene, styrene-butadiene copolymer, polybutadiene, ethylene-propylene copolymer, butyl rubber, nitrile rubber and the mixture thereof.

5. A vulcanizable rubber composition according to claim 1, in which said rubber is at least one selected from the group consisting of natural rubber, polyisoprene, styrene-butadiene copolymer and the mixture thereof.

6. A vulcanizable rubber composition which comprises 100 parts by weight of at least one rubber selected from the group consisting of natural rubber, polyisoprene, styrene-butadiene copolymer and the mixture thereof and 0.5 – 2.0 parts by weight of 3,9-(2-hydrazidoethyl)-2,4,8,10-tetraoxaspiro-[5,5]-undecane as a stiffener.

7. A vulcanized rubber which is obtained by vulcanizing a rubber composition in the presence of 3,9-(2-hydrazidoethyl)-2,4,8,10-tetraoxaspiro-[5,5]-undecane as a stiffener.

8. A stiffener for a rubber composition comprising 3,9-(2-hydrazidoethyl)-2,4,8,10-tetraoxaspiro-[5,5]-undecane.

* * * * *